Patented June 5, 1928.

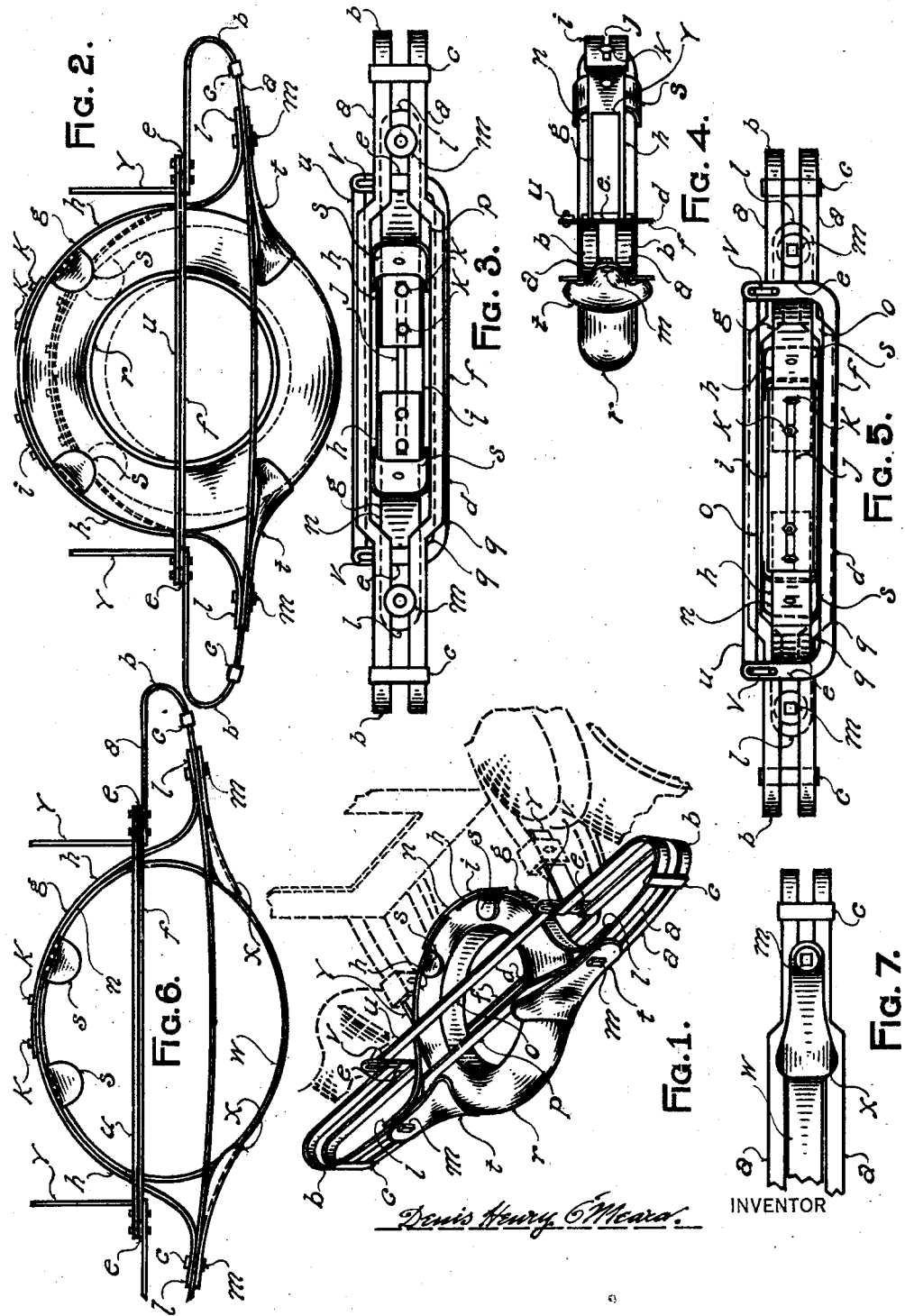

1,672,335

UNITED STATES PATENT OFFICE.

DENIS HENRY O'MEARA, OF DETROIT, MICHIGAN.

COMBINED SPRING TIRE CARRIER AND VEHICLE BUMPER.

Application filed June 25, 1927. Serial No. 201,385.

My invention relates to improvements in vehicle bumpers in which a forwardly projecting pneumatic tire is carried horizontally in a crosswise vehicle or air-plane bumper thus combining an air pressure rubber tire bumper in a transverse steel bumper, and the objects of my improvement are, first, to give to the ordinary type of steel spring bumper a pneumatic shock absorbing quality to co-operate with its natural spring movement and produce the same results in a bumper as a pneumatic tire does on a wheel; second,—to produce a spring bumper in which a universal member therein serves as a carrier for a tire as a tire bumper, and at the same time serves as an auxiliary impact spring and having a common method of adjustment to change the said member as a tire holder to fit different sizes of tires, and likewise to change same member as an auxiliary bumper spring to give greater or lesser resistance; third,—to produce an efficient and presentable vehicle bumper with means in addition for carrying a tire as a spare tire or bumper tire, but in which a tire may or may not be carried; fourth,—to improve the appearance of the ordinary type of bumper by giving it a softer and more massive proportion to the vehicle, and a bumper that will prove a factor in safety and do less harm to pedestrians and property in collision.

In the said drawings illustrating the preferred form of this invention, Fig. 1 is a perspective view of the combined spring bumper and tire carrier attached to the front of an automobile and with a pneumatic tire bumper in place; Fig. 2 is a top view of the combined spring carrier and crosswise bumper detached from the vehicle, with a pneumatic tire in place and in dotted outline showing the preferred method of making the spring carrier frame smaller with a corresponding smaller tire in position; Fig. 3 is a front view of Fig. 2, with tire removed; Fig. 4 is an end view of Fig. 2; Fig. 5 is a rear view of the detached bumper without the accessory tire; Figs. 6 and 7 show a second embodiment of the invention; Fig. 6 is a broken top view of the detached crosswise bumper showing the semicircular carrier frame contracted and the convex face of the bumper spring to a greater convex position as a result and showing a resilient oval bumper of flat spring metal in the crosswise bumper instead of the pneumatic tire shown elsewhere; Fig. 7 is a broken front view of one end of Fig. 6.

While I show herein the spring tire carrier construction, built into a double frame bumper, it is plain it can be just as well built into a triple or single frame bumper and with many general and minor changes in construction and configuration, and while I show an open tire carrier it may be a sheet metal or wood case or the like, and while I use a pneumatic tire illustrating my invention, a mechanical steel tire or wheel, or a solid tire or wheel of wood, rubber or other material may be used, or an incomplete tire or wheel may be substituted, or an oval shape member or one with a circular front and a deformed or specially designed back portion for better results may be substituted instead of a true wheel or tire as shown, and while a spare tire or wheel that may be used also on the vehicle is preferred, a specially designed tire or wheel or circular body may be used as well, and while I show the tire or wheel removably secured in the crosswise bumper it may be permanently secured therein. And, while I use an auto here, it is serviceable also on an airship or boat.

Referring to the drawings which are the subject of this specification $a$—$a$, are vertically spaced parallel bars of flat spring metal bent flatwise at each end into return loops $b$—$b$, and held in spaced relation by the adjustable clamps $c$—$c$. At $d$, is a rigid crosswise stiffening bar with upwardly extending ends $e$—$e$, producing a three-way connecting back frame $f$, of flat material bent edgewise and with an open top and depressed lower portion, and to the sides $e$—$e$, thereof the approaching ends of the frames $a$—$a$, are attached thus completing a double vertically faced continuous frame of band material with a stationary back portion and an impact front portion connected by loop ends. At $g$, is a substantially semicircular two piece enclosing band of flat spring steel in opposed halves $h$—$h$, connected at back by a curved bridge plate $i$, provided with a longitudinal slot $j$, therein through which bolts $k$—$k$ are passed engaging apertures in members $h$—$h$. The return ends $l$—$l$, of said enclosing band are curved outwardly to a parallel position with the impact face of the bumper and are slidably and removably secured against the inner surface thereof through the spaced opening in frame by the additional clamps m—m, at each end of bumper, thus producing a deep spring truss and tire carrier n, extending rearwardly in a horizontal position from the center of the impact portion of the bumper and making a part thereof and movable therewith back and forth through the communicating edge opening o, in the stationary frame f, the said semi-circular spring frame n, being shaped like a spreading inverted U, in the present case, with outwardly flared ends and producing when thus secured to the bumper an elliptic impact portion. A second crosswise edge opening p, is centrally situated in the impact face of the bumper and made therein by double opposed offsets q—q, bent away from each other at an inclined angle in the frames a—a, providing a greatly increased space between the upper and lower edges thereof from the corresponding frame space in the end portions thus producing an open design common in many makes of bumpers, but greatly enlarged herein and put to a new and useful purpose in the present invention. An inflated rubber tire r, preferably a spare tire and adapted for use otherwise on a vehicle is put tightly into the spring carrier n, and into the adjacent crosswise opening p, in the impact portion of bumper in a sidewise position, and in such a manner that a portion of the tire will project beyond the outer face thereof in a horizontal position thus becoming one with the impact portion of the bumper and serving as a projected tire bumper, and held in such projected position by the said enclosing spring carrier frame n, against collision. It will be noted the said semicircular spring frame will spring slightly with the independent yield of the tire bumper against the attached impact portion of the carrier bumper, while in the case of a flat band tire there is a considerable triple impact action between the crosswise bumper carrier member and spring tire. At s—s are vertical receiver lugs attached to the carrier band g, and extending inwardly to support and hold the tire or wheel r, evenly inside the enclosing frame n. At t—t, are adjustable and removable spring lugs of stamped sheet metal clamped against the outer face of the bumper and extending horizontally thereon over the end edges of the crosswise tire opening p, in opposed relation to each other to shorten or lengthen the opening by approaching or moving away the said keeper lugs at each end of the opening, thus adjustably changing the opening to fit different sizes of tires. The said inclined lugs t—t, have a flat clamping end slidably mounted on the frame and a free spring end outwardly inclined and with the end edge concaved to finish against the projected tire and exert a spring pressure thereagainst at either side to keep the extended tire in the bumper. The semi-circular spring frame g, is made in opposed halves h—h, to permit the spring frame n to be enlarged or contracted by spreading or approaching the meeting ends on the connecting plate i, or by lapping the same to adapt the frame to fit different sizes of tires as a tire carrier, or to increase or lessen the spring resistance of the frame as an auxiliary spring truss to reinforce the bumper, likewise the diameter of the said semi-circular spring frame may be changed by spreading or approaching the curved attaching ends l—l on the frame of the bumper and securing them at different points thereon. Thus the said spring frame n, becomes a part of the impact portion of the bumper transmitting any shocks received by the tire bumper therein to the adjacent impact member. It will be easily seen the spreading reverse curves l—l, and the central semi-circular portion g, react oppositely producing in place a free self-acting truss spring and spring tire carrier having the added advantage of a common means of adjustment as a bumper spring in one capacity, and as a tire carrier in another. In other words, the construction of the said member n, as a bumper spring is an accident of its construction as a tire carrier, and "vice versa." The described universal member n, is best shown as a truss spring in Fig. 6, with connecting plate i, discarded and the approaching ends lapped as the bumper might preferably be adjusted when no tire is used and increased stiffness therein is essential, thereby forming in this adjusted position an elliptic impact portion. Fig. 2 shows the semicircular member n, used as a tire carrier, while serving also as a bumper spring in a lesser degree. A connecting cross bar u, bolted to the upwardly extending sides e—e, of the stationary frame f, serves to close the open top thereof after the tire r, is placed in the carrier n, thus permitting the tire to be put into the impact opening from the inside of the bumper in some cases and the vertical slot holes v—v, in the said side ends e—e, permit the movable cross bar u, to be raised and lowered on the sides e—e, to fit different sizes of tires or wheels.

Fig. 6 and Fig. 7 show a second embodiment (in part) of the present invention. At w, therein is shown a continuous oval band of flat spring metal secured inside the carrier member n, instead of the pneumatic tire shown elsewhere, thereby forming substantially a spring tire situated and mounted in the same manner as the pneumatic tire, and serving the same purpose as the rubber tire bumper already described. An oval instead of a round shape is desirable where a flat metal band is used and a wide projected portion is required with a minimum depth.

Since it is only the convex portion of a wheel or tire projecting outside the face of the bumper that becomes actively the bumper it is plain the main purpose of the invention may be equally carried out with an oval member $w$, as well as a circular member $r$, or by such a member cut away at the back or otherwise abbreviated and mechanically secured to the said carrier member $n$. At $x$—$x$, are shown opposed spring lugs outwardly curved to finish against the oval member $w$, and otherwise of the same general shape and serving the same purpose as the corresponding lugs $t$—$t$, already described. In both cases these inclined approach lugs are preferably made of tempered sheet steel and possess a recoil resistance to protect the tire. At $y$—$y$, are shown angle lugs for securing the bumper to a vehicle, airplane, etc.

From the foregoing it will be plain that improved features in a bumper for vehicles have been produced and that changes in the minor details may be resorted to, and the right is herein reserved to make such changes falling within the scope of the invention.

Having thus described my invention I claim:

1. In combination with a transverse vehicle bumper, having a resilient impact portion, means for adapting said bumper to hold a tire or wheel therein in such a manner that a portion thereof will project beyond outer face of the bumper in a sidewise position and be movable backward and forward with movement of said impact portion and in said conjunction therewith producing a combined tire carrier and bumper, and means for attaching the same to a vehicle.

2. In a transverse vehicle bumper, the combination of an adjustable tire carrier mounted horizontally and centrally therein and adapted to hold a tire or wheel in such a manner that a portion thereof will project beyond the outer face of said bumper in a sidewise position as an auxiliary tire bumper, and means for attaching said combined bumper and tire carrier to a vehicle.

3. In combination with a transverse resilient vehicle bumper, a crosswise spring truss extending rearwardly and horizontally from the center of said bumper and having return ends attached to each end thereof producing an unequal elliptic impact portion movable back and forth as one member, said inwardly curved spring truss being adapted to hold a resilient tire or elliptic member or a portion thereof in such a manner that the outer portion of the same will project beyond the outer face of the bumper in the capacity of an auxiliary tire bumper to the said elliptic crosswise bumper, means for contracting, enlarging or spreading said inwardly extending spring truss to change the arc of the convex outer face of the bumper thereby increasing or lessening the spring power of said bumper, or regulating the projection of said auxiliary tire member outside said bumper, and means for attaching said compound bumper to a vehicle.

4. In combination with a transverse resilient bumper, an adjustable crosswise spring frame extending rearwardly from the center of said bumper and in the horizontal plane thereof and adapted to hold a tire or wheel or a section thereof in said frame in such a manner that a portion thereof will project beyond the outer face of said bumper in a horizontal position and held in said projected position against shock of collision by the said enclosing frame, thus producing a spring tire carrier and spring truss in one member combined with the impact portion of said bumper and movable back and forth therewith, and means for attaching said spring bumper and tire carrier to a vehicle.

5. In a transverse vehicle bumper having a resilient impact portion, the combination of a spring frame extending rearwardly and in a horizontal position from the center of the bumper and adapted to hold a tire or wheel therein in such a manner that a portion thereof will project beyond the outer face of said bumper in a horizontal position and sustained in such projected position against the shock of collision by said spring frame thus comprising a deep spring bumper truss and spring tire carrier in one member, and in said conjunction therewith producing a compound tire and crosswise bumper, adjustable means for enlarging or contracting said truss and tire carrier, adjustable approach lugs slidably mounted on the face of the bumper and extending horizontally thereon toward the center of the bumper from each end thereof to shorten or lengthen crosswise tire opening to suit the projected portion of the tire, said lugs having free opposed spring ends inclined outwardly against the periphery of said projected tire and concaved to finish thereagainst at either side thereof while holding said tire in place by spring pressure, and means for attaching said combined spring tire carrier and bumper to a vehicle.

6. In a transverse vehicle bumper having a resilient impact portion, the combination of a substantially semicircular enclosing frame of spring material adapted to fit around a portion of a tire or wheel, subsequently referred to, and with the return ends of said enclosing frame flexibly and adjustably attached to the impact portion of the bumper, said frame being centrally attached thereto in a horizontal position, and extending rearwardly from the center of the impact portion and beyond the back of said bumper and movable back and forth with movement of said impact portion, thus comprising a deep spring truss and tire carrier combined to reinforce said bumper as an auxiliary bumper spring and as a spring carrier to hold a tire, said carrier and truss member being shaped like a spreading inverted U and adapted to hold a wheel or tire sidewise therein in such a manner that a lesser portion thereof will project beyond the outer face of the bumper in a horizontal position, said tire in place being a removable part of said impact portion and held in such projected position by said spring carrier, adjustable means for enlarging or contracting said semicircular enclosing frame and means for attaching said spring truss bumper and tire carrier to a vehicle.

In testimony that I claim the foregoing I have hereunto set my hand this 18th day of June, 1927, at Detroit, county of Wayne, State of Michigan.

DENIS HENRY O'MEARA.